No. 616,383. Patented Dec. 20, 1898.
N. F. WILLATT.
VELOCIPEDE.
(Application filed Nov. 15, 1897.)
(No Model.) 3 Sheets—Sheet 2.
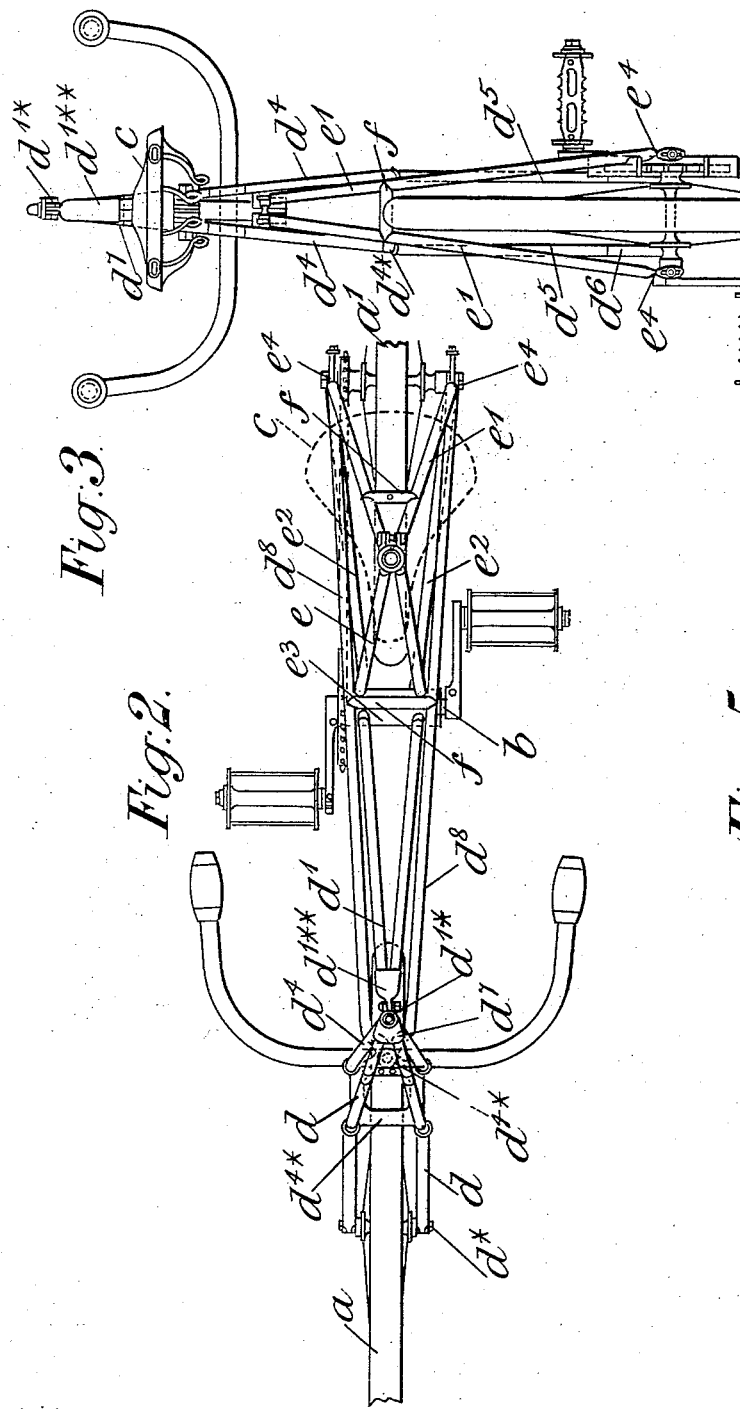
Witnesses:
Edward K. Allen,
Herbert Bradley.
Inventor
Norris Fowler Willatt
By Knight Bros
Attys.

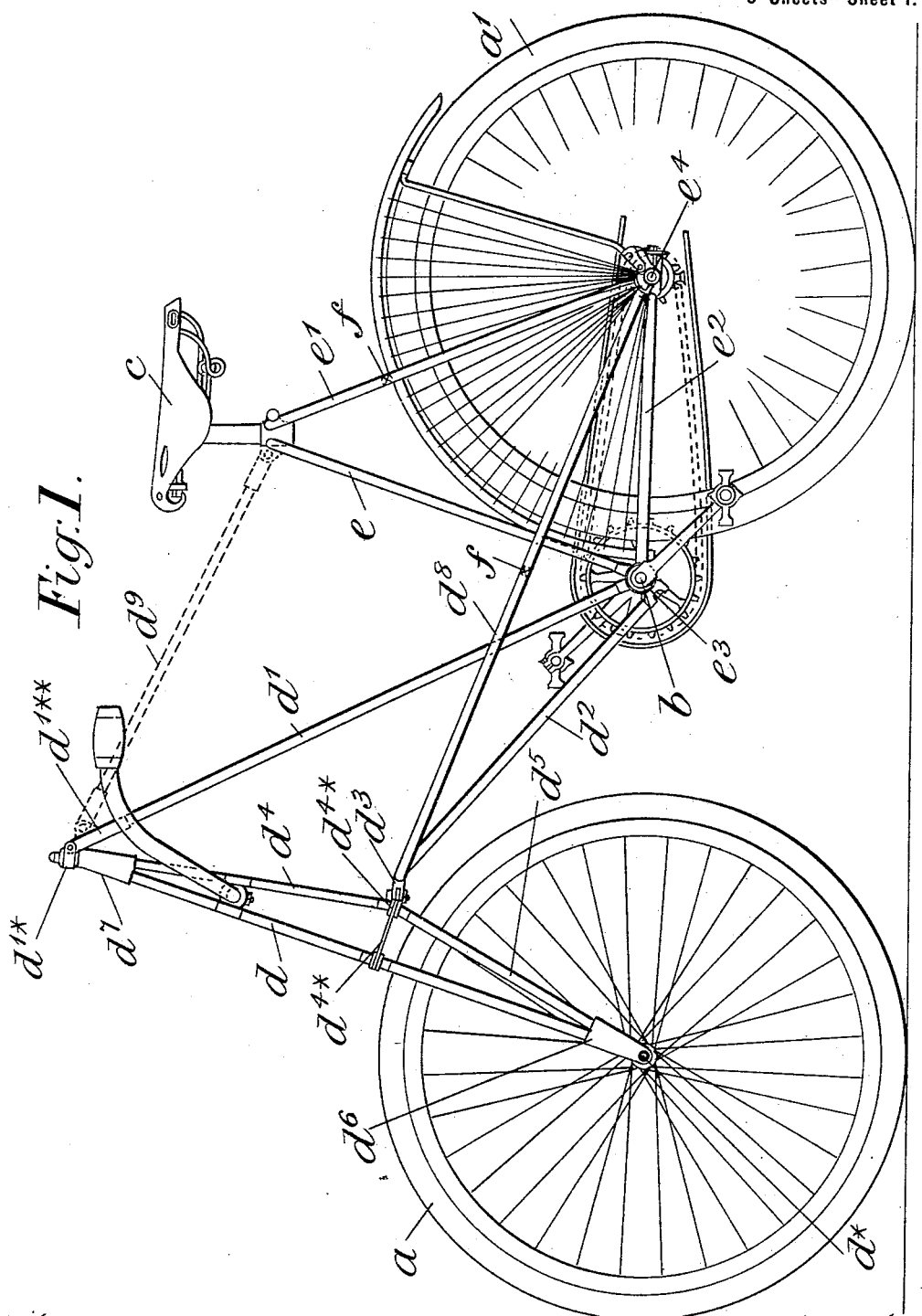

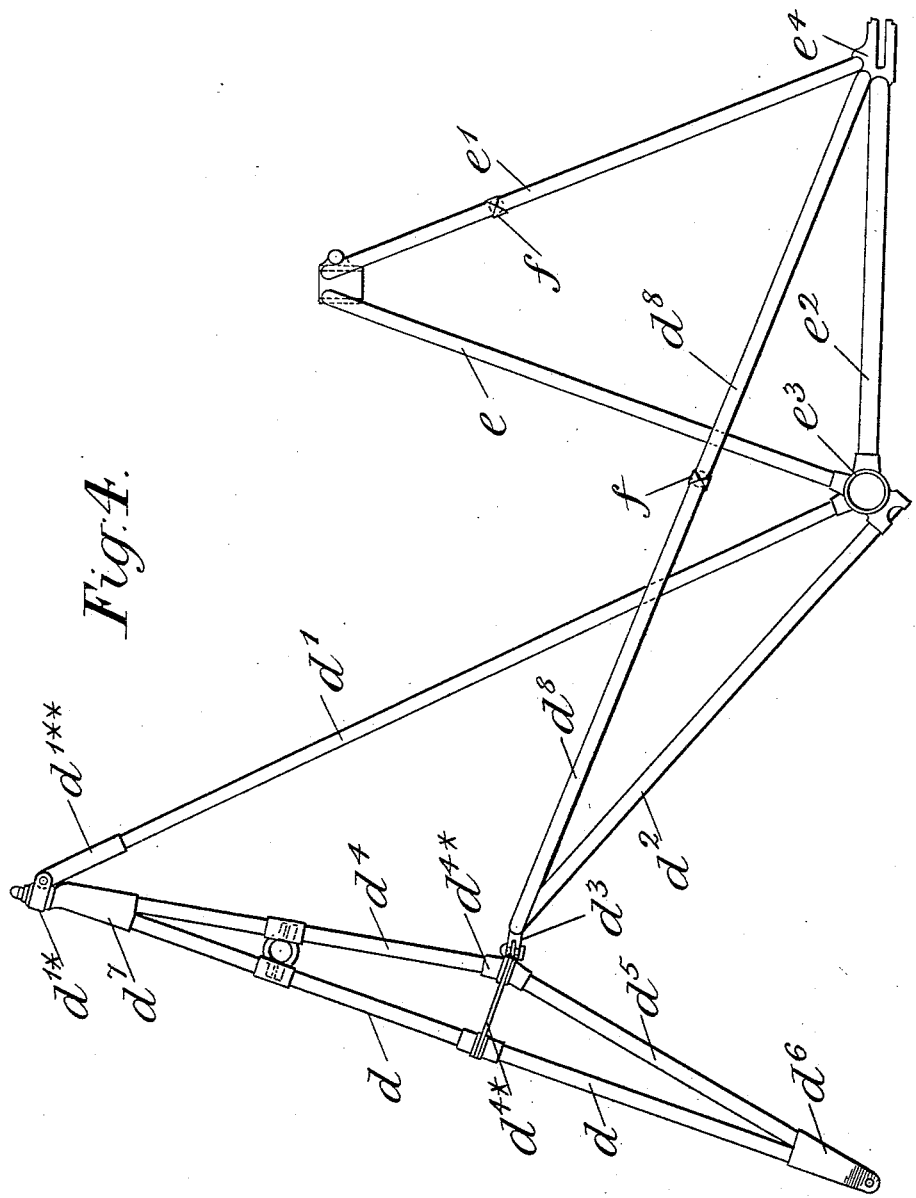

UNITED STATES PATENT OFFICE.

NORRIS FOWLER WILLATT, OF LONDON, ENGLAND, ASSIGNOR OF TWO-THIRDS TO GEORGE BEVERLEY COOPER AND OLIVER BARNETT, OF SAME PLACE.

VELOCIPEDE.

SPECIFICATION forming part of Letters Patent No. 616,383, dated December 20, 1898.

Application filed November 15, 1897. Serial No. 658,604. (No model.)

*To all whom it may concern:*

Be it known that I, NORRIS FOWLER WILLATT, secretary, a subject of the Queen of Great Britain, residing at 28 Shaftesbury avenue, London, in the county of Middlesex, England, have invented certain new and useful Improvements in or Connected with Velocipedes, (for which I have obtained a patent in Great Britain, No. 26,051, dated November 18, 1896,) of which the following is a specification, reference being had to the drawings hereunto annexed and to the letters marked thereon—that is to say:

The invention relates to improvements in or connected with velocipedes, more especially applicable to bicycles intended for the use of ladies; and the object of the invention is to obtain a frame of the requisite strength combined with extreme lightness.

In the accompanying drawings, Figure 1 is a side elevation of a lady's bicycle constructed according to the present invention. Fig. 2 is a plan thereof, but with the mud-guard and dress-guard removed for the sake of clearness. Fig. 3 is a rear elevation thereof, but with similar parts removed. Fig. 4 is a side elevation of the frame separately, and Fig. 5 is a plan thereof.

In the several figures, in which like parts are indicated by similar letters of reference, Figs. 4 and 5 are drawn to an increased scale with respect to the other figures of the drawings.

$a$ $a'$ represent, respectively, the front and rear wheels of the bicycle.

$b$ represents the crank or pedal axle, and $c$ represents the saddle.

The frame of the bicycle is constructed of light steel or other tubes arranged in pairs upon each side of the central vertical plane of the machine. The main parts of the frame consist of two isosceles triangles $d$ $e$, partly formed by the legs $d$ $d'$ $e$ $e'$, and which triangles at one extremity of their bases are united by a boss or bracket $e^3$, which carries the crank or pedal axle $b$. The rear triangle $e$ at the other extremity of its base is fixed with a boss or bracket $e^4$, carrying the bearings of the rear or driving wheel $a'$, and the bosses or brackets $e^3$ $e^4$ are connected by a tube $e^2$, which constitutes the base of the triangle, while the apex of the triangle $e$ carries the saddle $c$. The other or front triangle $d$ at the front extremity of its base carries the bearing $d^*$ for the front or steering wheel $a$, and the tube $d^2$, forming the base-line of this triangle, is carried upward at an angle from the boss or bracket $e^3$, carrying the pedal-axle $b$, to leave clearance for the front or steering-wheel $a$ when turning on its steering-axis, while the upper end of the tube $d^2$ is fixed with a boss or bracket $d^3$, pivotally connected with the fork-frame, as hereinafter more fully described. The fork is composed of the front leg $d$ of this triangle and two stays $d^4$ $d^5$, fixed therewith at each end thereof by brackets or fittings $d^6$ $d^7$ and arranged at an angle thereto, so as to intersect one another, and there united by a bracket or fitting $d^{4*}$ and, together with the front leg $d$, forming a frame. This frame, at its upper end, is, by the fitting $d^7$, pivotally connected with the head $d'^*$, which is carried by the fitting $d'^{**}$ of the after leg $d'$ of the front triangle and the fitting $d^{4*}$ of the stays $d^4$ $d^5$ is pivotally connected to the bracket or fitting $d^3$, to which the tube forming the upwardly-inclined base-line $d^2$ of the front triangle is fixed.

In order to give the necessary strength and rigidity to the connection of the two triangles and generally to the frame of the machine, a main stay $d^8$ is employed, which extends upwardly at an angle in a single span from the bracket or fitting $e^4$ at the rear extremity of the base $e^2$ of the rear triangle to the bracket or fitting $d^3$, which is pivotally connected with the fitting $d^{4*}$, uniting the stays $d^4$ $d^5$ of the front leg $d$ of the front triangle. By reason of the main stay $d^8$ being unconnected with any other part of the frame the force of shocks is distributed along the entire length thereof and the danger is avoided of localizing a strain to any particular point and which would be liable to occur if the length of the main stay $d^8$ were broken by junction with intermediate parts of the frame of the machine.

By the construction of frame hereinbefore described a clear space is left between the triangles for the dress and limbs of the rider and at the same time the strength of the structure is improved.

In constructing a bicycle for the use of gentlemen an auxiliary stay is connected with the apices of the two triangles, so as to lie parallel, or approximately so, with the main stay $d^8$, as indicated by the dotted lines $d^9$ in Fig. 1.

As hereinbefore explained and as clearly shown at Figs. 2, 3, and 5, the several parts of the frame are formed in pairs, one of each pair being arranged on each side of the central vertical plane of the bicycle, and these duplicate parts are connected together at suitable points by means of transverse bars or stays $f$.

It will be obvious that the construction of frame hereinbefore described is also applicable to tricycles or the like.

Having now particularly described and ascertained the nature of the said invention and in what manner the same is to be performed, I declare that what I claim is—

A velocipede-frame comprising two triangles formed by the parts $d$, $d'$, $d^2$ and $e$, $e'$, $e^2$, the part $d^2$ being upwardly inclined and fixed with a fitting $d^3$ pivotally connected with the fork-frame above the wheel $a$, the triangles at their bases being united by a bracket carrying the pedal-axle, the whole device being tied together and stiffened by a main stay $d^8$ extending in a single span from the fitting $d^3$ to a fitting $e^4$ at the rear extremity of the base of the rear triangle; substantially as herein shown and described and for the purpose stated.

NORRIS FOWLER WILLATT.

Witnesses:
C. MELBOURNE WHITE,
THOMAS V. GRAFTON.